US008871866B2

(12) United States Patent
Guo et al.

(10) Patent No.: US 8,871,866 B2
(45) Date of Patent: Oct. 28, 2014

(54) POLY(ARYLENE ETHER) COMPOSITION AND A COVERED CONDUCTOR WITH FLEXIBLE COVERING WALL AND LARGE SIZE CONDUCTOR

(75) Inventors: Hua Guo, Selkirk, NY (US); Juha-Matti Levasalmi, Delmar, NY (US)

(73) Assignee: Sabic Global Technologies B.V. (NL)

( * ) Notice: Subject to any disclaimer, the term of this patent is extended or adjusted under 35 U.S.C. 154(b) by 776 days.

(21) Appl. No.: 12/273,792

(22) Filed: Nov. 19, 2008

(65) Prior Publication Data

US 2010/0122845 A1    May 20, 2010

(51) Int. Cl.
| | |
|---|---|
| H01B 3/30 | (2006.01) |
| C08L 23/04 | (2006.01) |
| C08L 71/12 | (2006.01) |
| H01B 7/00 | (2006.01) |
| C08L 23/06 | (2006.01) |
| H01B 3/42 | (2006.01) |
| H01B 3/44 | (2006.01) |
| C08L 23/12 | (2006.01) |
| C08L 23/08 | (2006.01) |
| C08L 53/02 | (2006.01) |

(52) U.S. Cl.
CPC .................. *C08L 23/06* (2013.01); *C08L 23/12* (2013.01); *C08L 71/12* (2013.01); *H01B 3/427* (2013.01); *H01B 3/441* (2013.01); *H01B 3/30* (2013.01); *C08L 23/0815* (2013.01); *C08L 53/02* (2013.01)
USPC .......................................... 525/88; 525/92 R

(58) Field of Classification Search
USPC ....................... 525/89, 92 D, 88; 174/110 SR
See application file for complete search history.

(56) References Cited

U.S. PATENT DOCUMENTS

| | | | |
|---|---|---|---|
| 2,933,480 A | 4/1960 | Gresham et al. | |
| 3,093,621 A | 6/1963 | Gladding | |
| 3,211,709 A | 10/1965 | Stephen et al. | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,166,055 A | 8/1979 | Lee, Jr. | |
| 4,584,334 A | 4/1986 | Lee, Jr. et al. | |
| 4,760,118 A | 7/1988 | White et al. | |
| 4,808,647 A | 2/1989 | Abolins et al. | |
| 4,815,984 A * | 3/1989 | Sugiyama et al. | 439/211 |
| 4,945,018 A | 7/1990 | Abolins et al. | |
| 5,011,736 A | 4/1991 | Abolins et al. | |
| 6,025,419 A | 2/2000 | Kasowski et al. | |
| 6,306,978 B1 | 10/2001 | Braat et al. | |
| 7,332,677 B2 | 2/2008 | Xu et al. | |
| 7,718,721 B2 | 5/2010 | Balfour et al. | |
| 7,989,701 B2 | 8/2011 | Kosaka et al. | |
| 2002/0129961 A1 * | 9/2002 | Baker | 174/72 A |
| 2004/0102551 A1 | 5/2004 | Sato et al. | |
| 2005/0154100 A1 | 7/2005 | Kosaka et al. | |
| 2006/0106139 A1 * | 5/2006 | Kosaka et al. | 524/90 |
| 2006/0131050 A1 * | 6/2006 | Mhetar et al. | 174/110 R |
| 2006/0131053 A1 | 6/2006 | Kubo et al. | |
| 2006/0135661 A1 | 6/2006 | Mhetar et al. | |
| 2006/0135695 A1 | 6/2006 | Guo et al. | |
| 2006/0278425 A1 * | 12/2006 | Harada et al. | 174/110 R |
| 2009/0084574 A1 | 4/2009 | Balfour et al. | |

FOREIGN PATENT DOCUMENTS

| | | |
|---|---|---|
| EP | 0135726 A2 | 4/1985 |
| EP | 0413972 A2 | 2/1991 |
| WO | 9808898 | 3/1998 |
| WO | 2006065519 A1 | 6/2006 |
| WO | 2008076480 | 6/2008 |

OTHER PUBLICATIONS

ASTM B 258-02, Standard Specification for Standard Nominal Diameters and Cross-Sectional Areas of AWG Sizes of Solid Round Wires Used as Electrical Conductors, published Jun. 2002, 5 pages.
ASTM D790-03, Standard Test Methods for Flexural Properties of Unreinforced Plastics and Electrical Insulating Materials, published Apr. 2003, 11 pages.
International Search Report for International Application No. PCT/US2009/057623, mailed Apr. 30, 2010, 8 pages.
Written Opinion for International Application No. PCT/US2009/057623, mailed Apr. 30, 2010, 5 pages.
Supplementary European Search Report; International Application No. PCTUS/2009/057623; Date of Search: Jan. 23, 2012; 6 pages.
JP11185532, Jul. 9, 1999, Abstract Only, 1 page.

* cited by examiner

*Primary Examiner* — Jeffrey Mullis
(74) *Attorney, Agent, or Firm* — Cantor Colburn LLP

(57) ABSTRACT

Disclosed herein is covered conductors with a normal to large conductor cross-section area (AWG 5 to AWG 24). The thickness of the coating can be, for example, 0.25 to 8.0 millimeter (mm). Also disclosed are a thermoplastic composition comprising a poly(arylene ether) having an intrinsic viscosity greater than 0.25 dl/g as measured in chloroform at 25° C., a styrenic resin, a polyolefin resin, and optionally a flame retardant, a compatibilizer, or a combination of a flame retardant and a compatibilizer. The coating comprises the thermoplastic composition described above.

8 Claims, No Drawings

POLY(ARYLENE ETHER) COMPOSITION AND A COVERED CONDUCTOR WITH FLEXIBLE COVERING WALL AND LARGE SIZE CONDUCTOR

BACKGROUND OF INVENTION

This disclosure relates to thermoplastic compositions. In particular, the disclosure relates to poly(arylene ether) compositions. It also discloses a covered conductor. The covered conductor has a flexible wall covering and a conductor of a normal or large cross-section area. The covering comprises a poly(arylene ether) compositions. An auto-wire harness assembly comprising the covered conductor and an end-use-equipment comprising the auto-wire harness assembly are also disclosed herein.

Polyvinyl chloride resins have long been used as the coating resin in the covered conductor and cable industry. However, there is mounting concern over the environmental impact of halogenated materials and non-halogenated alternatives are being sought. This search has met with some success in polyethylene compositions however useful polyethylene compositions typically have high levels of inorganic flame retardant that can result in deterioration of some mechanical properties and processability.

Additionally, as electronic devices become increasingly compact in design there is an increasing need for the cables and wires employed as part of these devices and their accessories to be more flexible and durable. Similarly, as the number of electronic components of automotive engines increase there is an increasing need for the wires connecting the electronic components to be flexible and durable over a range of temperatures and after exposure to the various chemicals found in an automotive environment. The covered conductor (as well as the wire harness assembly) used inside a passenger compartment (such as under the roof, under the carpet, behind the instrument panel, inside door frame) and inside the trunk is also trending towards the same direction. In some application cases, coated conductor is used to transfer electrical power to operate moving devices. In these applications a normal to large size conductor is needed. For these normal to large size conductor, in order to enable bundled wire flexibility and or final wire harness flexibility, the insulting coating material needs to be more flexible. So, there is ever increasing desire to use a more flexible covering layer on a conductor with normal and large diameter (or cross-section area). The covered conductor wire still should meet some essential performance requirements. Industrial standards such as ISO 6722 (such as 2002, Dec. 15 revision) may still be used as guidance.

The more flexible insulation wall covering material may pose difficulties when using crosslinked polyethylene. For crosslinked polyethylene the thinner insulation layer thickness may result in shorter thermal life when aged at oven temperatures between 150° C. and 180° C. This limits their thermal rating. The deleterious effects created by these extremely thin wall requirements have been attributed to copper catalyzed degradation, which is widely recognized as a problem in the industry.

It is possible to coat the copper core with, e.g., tin, in order to prevent the copper from contacting the crosslinked polyethylene but the additional cost of the coating material and the coating process are expensive. In addition, some automotive specifications require that the copper conductor be uncoated. It is also possible to add stabilizers, also known as metal deactivators, to the insulation material but it is recognized that stabilizers yield only partial protection for electrical wire having thin wall thicknesses.

Accordingly, there is a need for a thermoplastic composition with excellent mechanical properties and processability, which is important to the durability and cost effectiveness of covered conductors and cables made using the thermoplastic composition.

BRIEF SUMMARY OF EMBODIMENTS OF THE INVENTION

Disclosed herein are covered conductors with a normal to large conductor cross-section area (AWG 5 to AWG 24). The thickness of the coating can be, for example, 0.25 to 8.0 millimeter (mm). The coating comprises a poly(arylene ether) composition as described below. This disclosure also includes an automotive wire harness assembly comprising the covered conductors and an end use product comprising the automotive wire harness assembly. In addition, the conductor material also can be glass or plastics in optical fiber application for single transmission.

DESCRIPTION OF EMBODIMENTS OF THE INVENTION

The above described need is met by a thermoplastic composition comprising a poly(arylene ether) having an intrinsic viscosity greater than 0.25 dl/g as measured in chloroform at 25° C., a styrenic resin, a polyolefin resin, and optionally a flame retardant, a compatibilizer, or a combination of a flame retardant and a compatibilizer.

Also disclosed herein is a covered conductor comprising: a conductor and a covering disposed over the conductor. The covering comprises a thermoplastic composition. The thermoplastic composition comprises a poly(arylene ether) having an intrinsic viscosity greater than 0.25 dl/g as measured in chloroform at 25° C., a styrenic resin, a polyolefin resin, and optionally a flame retardant, a compatibilizer or a flame retardant and a compatibilizer. The covered conductor essentially meets the performance requirement of ISO 6722, wherein the covering is disposed over the conductor, wherein the conductor has a cross-section that meets as least one of following: (i) American Wire Gauge (AWG) of AWG 24 to AWG 5, (ii) a cross-section area of 0.20 to 16.8 $mm^2$ (corresponding to AWG 24 to AWG 5 according to ASTM B258-02); (iii) a nominal diameter of 0.51 to 4.62 mm (corresponding to AWG 24 to AWG 5 according to UL 1581, 4th edition, Table 20.1). The covering of the covered conductor has a thickness of 0.25 to 8 mm.

As used herein the term "covered conductor" is intended to include coated wires, electrical wires, coated conductors, and the like.

The covered conductor may be used in an automotive wire harness assembly. An automotive wire harness assembly comprises a covered conductor as described in the preceding paragraph.

The automotive wire harness described in the preceding paragraph may be used in end use equipment.

In some embodiments the thermoplastic composition, useful in a covered conductor, automotive wire harness and end use equipment as described above, comprises 5 to 50 weight percent of poly(arylene ether), 1 to 70 weight percent of polyolefin resin, 1 to 60 weight percent of styrenic resin, optionally 0 to 35 weight percent of flame retardant, and optionally 1 to 30 weight percent of compatibilizer. Weight percents are based on the total weight of the thermoplastic composition.

In some embodiments the thermoplastic composition, useful in a covered conductor, automotive wire harness and end use equipment as described above, comprises 5 to 50 weight percent of poly(arylene ether) having an intrinsic viscosity greater than 0.25 dl/g as measured in chloroform at 25° C., 10 to 80 weight percent of polyolefin resin, 0 to 30 weight percent of compatibilizer, 1 to 55 weight percent styrenic block copolymer and 1 to 35 weight percent of flame retardant.

In some embodiments the thermoplastic composition, useful in a covered conductor, automotive wire harness and end use equipment as described above, comprises 5 to 50 weight percent of poly(arylene ether) having an intrinsic viscosity greater than 0.25 dl/g as measured in chloroform at 25° C., 10 to 80 weight percent of polyethylene resin, 0 to 30 weight percent of compatibilizer, 1 to 55 weight percent styrenic block copolymer and 1 to 35 weight percent of flame retardant.

In some embodiments the thermoplastic composition, useful in a covered conductor, automotive wire harness and end use equipment as described above, comprises 5 to 50 weight percent of poly(arylene ether) having an intrinsic viscosity greater than 0.25 dl/g as measured in chloroform at 25° C., 10 to 80 weight percent of low and/or medium density polyethylene resin, 0 to 30 weight percent of compatibilizer, 1 to 55 weight percent styrenic block copolymer and 1 to 35 weight percent of flame retardant.

In some embodiments, the thermoplastic composition has a flexural modulus of 400-1000 Megapascals (MPa) as determined by ASTM D790-03 using a speed of 1.27 millimeters per minute at thickness of 3.2 millimeters. Within this range the flexural modulus may be greater than or equal to 500 MPa, or, more specifically, greater than or equal to 600 MPa. Also within this range the flexural modulus may be less than or equal to 900 MPa, or, more specifically, less than or equal to 800 MPa. Flexural modulus values are the average of three samples.

The conductor may comprise a single thread(strand) or a bundle of several threads(strands). In some embodiments, a plurality of strands may be bundled, twisted, or braided to form a conductor. Additionally, the conductor may have various shapes such as round or oblong. The conductor may be any type of conductor used to transmit a signal. Exemplary signals include optical, electrical, and electromagnetic. Glass fibers are one example of an optical conductor. Suitable electrical conductors include, but are not limited to, copper, aluminum, steel lead, copper alloy, aluminum alloy, copper coated aluminum, nickel coated copper, tin coated copper, and nickel and tin coated copper.

In some embodiments, the conductor may have a cross-section that has an American Wire Gauge (AWG) number from AWG 24 to AWG 5. Within this range, the conductor may have a cross-section of AWG number greater than or equal to AWG 10, or, more specifically greater than or equal to AWG 12. Also within this range, the conductor may have a cross-section of AWG number less than or equal to AWG 20, or, more specifically, less than or equal to AWG 15.

In some embodiments, the conductor may have a cross-section area of 0.20 to 16.8 $mm^2$ (corresponding to AWG 24 to AWG 5 according to ASTM B258-02). Within this range, the conductor may have a cross-section greater than or equal to area of 0.52 $mm^2$ (AWG 20 according to ASTM B258-02), or, more specifically greater than or equal to 1.65 $mm^2$ (AWG 15, according to ASTM B258-02). Also within this range, the conductor may have a cross-section area less than or equal to 5.26 $mm^2$ (AWG 10, according to ASTM B258-02), or, more specifically, less than or equal 3.31 $mm^2$ (AWG 12, according to ASTM B258-02).

In some embodiments, the conductor may have a cross-section nominal diameter of 0.51 to 4.62 mm (corresponding to AWG 24 to AWG 5, according to UL 1581, 4th edition, Table 20.1). Within this range, the conductor may have a cross-section nominal diameter greater than or equal to area of 0.81 mm (AWG 20 according to UL 1581, 4th edition, Table 20.1), or, more specifically greater than or equal to 1.45 mm (AWG 15, according to UL 1581, 4th edition, Table 20.1). Also within this range, the conductor may have a cross-section nominal diameter less than or equal to 2.54 mm (AWG 10 according to UL 1581, 4th edition, Table 20.1), or, more specifically, less than or equal 2.05 mm (AWG 12, according to UL 1581, 4th edition, Table 20.1). The maximum and minimum range for the nominal diameter according to UL 1581, 4th edition, Table 20.1 may also apply herein.

The cross-sectional area of the conductor and thickness of the covering may vary and is typically determined by the end use of the covered conductor. The covered conductor is a covered conductor and the covered conductor can be used as electric wire without limitation, including, for example, for harness wire for automobiles, wire for household electrical appliances, wire for electric power, wire for instruments, wire for information communication, wire for electric cars, as well as ships, airplanes, and the like. In some embodiments the covered conductor is an optical cable and can be used in interior applications (inside a building), exterior applications (outside a building) or both interior and exterior applications. Exemplary applications include data transmission networks and voice transmission networks such as telephone networks and local area networks (LAN).

In some embodiments, the conductor comprises plurality of strands. In this case, the cross section area is defined as an equivalent to a summation of total cross section area of all strands.

The covering of the covered conductor in any embodiment may have a thickness of 0.25 to 8 mm. Within this range, the thickness of the covering of the covered conductor may be greater than or equal to 0.5 mm, or, more specifically, greater than or equal to 1.5 mm. Also within this range, the thickness of the coating of the covered conductor may be less than or equal to 5 mm, or, more specifically, less than or equal to 3 mm.

Exemplary covered conductors include all types of electrical wire. In some embodiments, the covered conductors are made into an assembly called "automotive wire harness" (also called wire harness, cable harness, cable wire harness, wire harness assembly, harness assembly, wiring clip, board assembly, car harness, vehicle wire harness, vehicular harness, harness wiring stems, assembly for protecting automotive electronics). It is foreseeable that an automotive wire harness assembly with more flexible coating may cause changes in other related components such as, for example, electric, electronic and mechanic parts or components (such as connectors, wrapping tapes) would also need to be modified. Exemplary electric, electronic and mechanic parts or components include anti-lock brake system, electronic control transmission, electronic controlled unit, electronic fuel injection, electronic spark advance, fusible link, HA integrated ignition assembly, load sensing timer, central door lock, distributor, digital clock, car audio, car burglar alarm, fuse seat, motor, horn, switch, buzzer, combination meter, lamp, ignition coil, relay, reverse sensor, alternator, flasher, energy saving unit, terminal, power seat unit, motor components, car CD, car LCD, regulator, rectifier, ignition module, rear view display, cruise controller, ballast complete set for headlights, lighting controller, ignition coil module, cigar lighter, carbon brush, solenoid valve, car hand-free mobile phone, car security system, car navigation system, car computer, wireless tire monitor, tire low pressure indicator, water temperature sensor, oil pressure sensor, charger, temperature recorder, battery capacity indicator, simmer switch, electronic fuel injection manifold, over heating protection system, over heating warning system, ignition and injection timing controller system, ignition timing controller system, deceleration spark advance controller, retarded injection timing controller system, retarded injection timing with speed, retarded injection timing with load, fuel controller system, feedback controller, air-fuel ratio feedback controller system, electronic controlled carburetor, electronic fuel injection system, electronic concentrated engine controller system, temperature sensor, pressure sensor, position sensor, speed sensor, knock sensor, intake flow sensor, temperature switch, photoelectric barrier, transmitter, receiver, sensor, oscillator, digital chronometer, electromagnetic beam barrier, analog/digital converter (A/D converter), supplemental inflatable restraint (SIR), supplemental restraint system (SRS), air cushion restraint system (ACRS), airbag, crash sensor, electronic crash sensor, primary sensor, safety sensor, secondary sensor, diagnostic module, readiness indicator, warning indicator, inflator assembly, squib, transfer cord, transverse electromagnetic (TEM) mode, amplifier, bidirectional coupler, directional coupler, injection probe, quasi-peak detector, solenoid regulator valve, converter bypass valve, electro anti-lock device, DC voltmeter, current probe, generator, DC generator, stator assembly (field frame assembly), field coil (excitation winding), armature assembly, armature winding, DC generator regulator, voltage regulator, current limiter, cutout relay, alternator regulator, field relay, charge indicator relay, electromagnetic regulator (vibrating type regulator), single stage voltage regulator, double stage voltage regulator, IC regulator (solid state regulator), built-in voltage regulator, battery (accumulator), starter, mechanically engaged drive starter, pre-engaged drive starter, sliding armature starter, sliding gear starter, coaxial drive starter, inertial drive starter, pick-up coil, distributor-less ignition system, ignition voltage reserve, voltage divider, ignition governor, ignition distributor, timer rotor, double-pole connector, internal cable, external cable, unscreened high-tension ignition cable, male tab, socket aperture, damping resistor, suppression filter, flat quick-connect termination, positive locking female connector, tab without shoulder, tab with shoulder, crimped termination, transformer, rectifier, over-current protection, miniature circuit breaker, fuse holder, blade terminal, electric horn, horn relay, back-up buzzer, multi-tone sound signaling device, wiper motor, heater motor, cooling fan motor, fuel pump motor, window lift motor, antenna motor (aerial motor), seat adjustment motor, washer pump, washer motor, lubricating motor, ignition switch, master lighting switch, direction indicator controller, hazard warning signal controller, interior light switch, audible warning (horn) controller, seat adjustment controller, power-take-off controller, tilt controller, front hood (bonnet) controller, real hood (boot) controller, radiator shutter controller, outside rear-view mirror adjustment controller, lighting switch, stop lamp switch, hand brake indicator switch, dimmer switch, turn signal switch, back-up lamp switch, parking lamp switch, instrument lamp switch, door lamp switch, reading lamp switch, wiper switch, washer switch, heater switch, fog lamp switch, black-out lamp switch, starting switch, engine start preheating switch, battery main switch, battery change-over switch, rocker switch, sliding roof controller, automatic antenna controller, radio receiver controller, diesel engine cut-off controller, headlight beam aiming controller, headlight wiper controller, headlight cleaner controller, battery isolating switch controller, optical warning controller, steering wheels adjustment controller, additional wheel drive controller, differential lock controller, radiator grill controller, range shift controller, centralized lubrication pressure indicator, automatic gearbox indicator, electronic speedometer, bimetallic oil pressure sensor, electromagnetic oil pressure indicator, moving magnet oil pressure indicator, variable resistance oil pressure sensor, oil level warning sensor, pressure warning sensor, air filter clog warning sensor, temperature warning sensor, electromagnetic fuel indicator, sealed beam unit, semi-sealed beam unit, signal system, combined lamps, reflex reflecting device, retro-reflecting device, discharge lamp, fog lamp, grouped lamps, hazard warning lamp, lower-beam (dipped beam) headlamp, upper-beam (main beam headlamp), headlamp leveling device, end outline marker lamp, license plate lamp, rear registration plate lamp, search lamp, side marker lamp, special warning lamp, stop lamp, reciprocally incorporated lamp, parking lamp, turn signal lamp, semi-sealed beam headlamp, signal lamp (indicator), tail lamp, door lock warning lamp, ceiling lamp, reading lamp, step lamp (courtesy light), instrument panel lamp, engine compartment lamp, bulb adaptor, and bayonet socket. Further more, the "end use equipment" comprising the wire harness can be an automotive vehicle (including passenger or non-passenger vehicle).

In addition, the covered conductor comprising may also be applied to non-automotive applications such as, for example, home or office furniture, electric appliances, telecommunications, rail-transportation, aero-transportation, power tools, and engineering equipment. In these non-automotive applications, the cover wire may be required to meet UL 1581, UL 62 or both UL 1581 and UL 62 performance standards.

In addition to covered conductors the thermoplastic composition may be useful in air craft wire guides, aircraft flooring, flexible tubing, particularly in the medical field.

In some embodiments, the covered conductor essentially meets the performance requirement of ISO 6722. The current version of ISO 6722 (as of revision of 2002 Dec. 15, revision 2004 Dec. 30) specifies a conductor size at least 0.13 mm$^2$ and a coating thickness at least 0.85 mm. Therefore, the term "essentially meets the performance requirement of ISO 6722" means that even though the conductor has a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm, the principles of ISO 6722 test (including the test items) will be met, allowing for the necessary modifications made for the difference in size.

As suggested above the thermoplastic composition is useful in covered conductor applications, particularly covered conductors such as electrical wires, employed in environments where they may be exposed to chemicals, such as gasoline, diesel fuel, antifreeze, and the like, that can result in degradation. In another aspect the composition has desirable adhesion to the wire. Adhesion must be sufficient to maintain the integrity of the wire under normal use but not so strong as to prevent intentional stripping. Typically a force of about 2 to 100 Newtons, depending on the size of the conductor core and thickness of the thermoplastic coating, is employed to strip the thermoplastic coating from a wire so it is desirable that the covered conductor has an adhesion strength between the conductive core and the thermoplastic composition that is less than or equal to the stripping force typically employed for the conductive core size and thermoplastic coating thickness. Exemplary stripping forces for various conductor sizes may be different from the current ISO 6722 (as of revision of 2002, Dec. 15 revision 2004 Dec. 30).

In some embodiments, the covered conductor may have a conductor having a cross-section that meets at least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm. The covered conductor may meet or exceed the current standards set forth in ISO 6722 (as of revision of 2002 Dec. 15, revision 2004 Dec. 30), such as flame retardance, heat aging, and scrape abrasion, making the covered conductor suitable for use in road vehicles. In particular the covered conductor could meet or exceed the heat aging standards for Classes A, B, or C as set forth in ISO 6722 (as of revision of 2002 Dec. 15, revision 2004 Dec. 30).

In some embodiments, the covered conductor has a scrape abrasion resistance of greater than 10 cycles, as determined by the scrape abrasion specification of ISO 6722 (as of revision of 2002 Dec. 15, revision 2004 Dec. 30) using a 7 Newton load, a needle having a 0.45 millimeter diameters, and covered conductor having a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm.

In some embodiments, a covered conductor comprises: a conductor; and a covering disposed over the conductor wherein the covering comprises a thermoplastic composition and the thermoplastic composition comprises a poly(arylene ether) having an intrinsic viscosity greater than 0.25 dl/g as measured in chloroform at 25° C., a styrenic resin, a polyolefin resin and optionally a flame retardant, a compatibilizer, or a flame retardant and compatibilizer, wherein the conductor has a cross-section that meets as least one of following: (i) American Wire Gauge (AWG) of AWG 24 to AWG 5, (ii) a cross-section area of 0.20 to 16.8 mm$^2$(corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm and wherein the thermoplastic composition has a tensile elongation at break greater than 30% as determined by ASTM D638-03 using a Type I specimen and a speed of 50 millimeters per minute, and a flexural modulus less than 1000 Megapascals (Mpa) as determined by ASTM D790-03 using a speed of 1.27 millimeters per minute. The details of this performance and test method can be found in U.S. Pat. No. 7,084,347 that is incorporated by reference by its entirety.

In some embodiments, a covered conductor comprises a conductor and a covering wherein the covering is disposed over the conductor. The covering comprises a thermoplastic composition and the thermoplastic composition comprises: 5 to 50 weight percent of poly(arylene ether) having an intrinsic viscosity greater than 0.25 dl/g as measured in chloroform at 25° C.; 10 to 80 weight percent of polyolefin resin, 0 to 30 weight percent of compatibilizer, 1 to 60 weight percent styrenic block copolymer and 1 to 35 weight percent of flame retardant. The covered conductor meets the performance requirement of ISO 6722, wherein the conductor has a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm and further wherein for a total length of 13,500 to 15,500 meters of covered conductor there are less than or equal to six individual lengths of covered conductor and each individual length of wire has a length greater than or equal to 150 meters.

In some embodiments, a covered conductor comprising a conductor and a covering wherein the covering is disposed over the conductor. The covering comprises a thermoplastic composition and the thermoplastic composition comprises: 5 to 50 weight percent of poly(arylene ether) having an intrinsic viscosity greater than 0.25 dl/g as measured in chloroform at 25° C.; 10 to 80 weight percent of polyethylene resin, 0 to 30 weight percent of compatibilizer, 1 to 60 weight percent styrenic block copolymer and 1 to 35 weight percent of flame retardant. The covered conductor meets the performance requirement of ISO 6722, wherein the conductor has a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm.

In some embodiments, a covered conductor comprises a conductor and a covering wherein the covering is disposed over the conductor. The covering comprises a thermoplastic composition and the thermoplastic composition comprises: 5 to 50 weight percent of poly(arylene ether) having an intrinsic viscosity greater than 0.25 dl/g as measured in chloroform at 25° C.; 10 to 80 weight percent of polyolefin resin, 0 to 30 weight percent of compatibilizer, 1 to 55 weight percent styrenic block copolymer and 1 to 35 weight percent of flame retardant, wherein the covered conductor meets the performance requirement of ISO 6722, the conductor a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1) and/or the covering of the covered conductor has a thickness of 0.25 to 8 mm. The coated conductor may have a long term chemical resistance to gasoline greater than or equal to 100 days. The long term chemical resistance to gasoline is tested according a method comprising: a) testing a coated conductor for chemical resistance according to ISO 6722 using ISO 1817 liquid C; b) aging the coated conductor at 23° C. and 50% relative humidity with no externally applied stress; and c) inspecting the coated conductor daily for a crack, wherein a) through c) are performed in the order given. The detailed procedure of long term chemical resistance test can found in U.S. Patent Publication No. 2006-0278425 that is incorporated herein by reference by its entirety.

In some embodiments, the composition described herein comprises at least two phases, a polyolefin phase and a poly(arylene ether) phase. The polyolefin phase is continuous and the poly(arylene ether) phase is dispersed in the polyolefin phase. Good compatibilization between the phases can result in, among others, improved physical properties including higher impact strength at low temperatures and room temperature, better heat aging, better flame retardance, better chemical resistance as well as greater tensile elongation. It is generally accepted that the morphology of the composition is indicative of the degree or quality of compatibilization. Small, relatively uniformly sized particles of poly(arylene ether) evenly distributed throughout an area of the composition are indicative of good compatibilization.

In some embodiments, the composition has poly(arylene ether) particles dispersed in the continuous polyolefin phase. When the composition is injection molded or extruded, particularly when extruded to form a covered conductor, the poly(arylene ether) particles may have an average diameter less than 5 micrometers or more specifically, less than or equal to 3 micrometers, or, even more specifically, less than or equal to 2 micrometers. As readily appreciated by one of ordinary skill in the art the poly(arylene ether) particles may have spherical or non-spherical shapes. The shape of the particles may be dependent upon molding or extruding conditions, particularly the amount of shear present during article formation. When the particle shape is non-spherical the diameter of the particle is defined as the longest linear dimension. This can alternately be described as the major axis.

In some embodiments, the composition has poly(arylene ether) particles dispersed in the continuous polyolefin phase. When the composition is injection molded or extruded the poly(arylene ether) particles have an average particle area less than or equal to 4 square micrometers ($\mu m^2$), or, more specifically, less than or equal to 2 square micrometers, or, even more specifically, less than or equal to 1 square micrometer determined as described below.

The average diameter and/or particle area of the poly(arylene ether) particles in an injection molded item may be determined using transmission electron microscopy. The composition is injection molded into a disc having a 3.2 millimeters thickness as is used in an ASTM D 3763-02 test. A portion located at the center (in terms of diameter) of the disc is removed and then sections having a thickness of 100 nanometers are removed from the center (in terms of thickness) of the portion. The sections are stained in freshly prepared ruthenium tetraoxide staining solution for 30 seconds. The microscopy studies may be performed on an electron microscope such as a Technai G2. Digital image acquisition may be performed using a camera such as a Gatan Model 791 side mount camera. Images may be analyzed using image analysis software such as Clemex Vision PE to determine the average diameter or average particle area. Only particles that have boundaries completely within the viewing area are included in the analysis. The analysis and the average values are based on at least 100 particles.

The average diameter and/or particle area of the poly(arylene ether) particles in an extruded item, such as a covered conductor, may be determined by removing a portion of the extruded thermoplastic and then sections having a thickness of 100 nanometers are removed from the portion at a depth of 50-60 micrometers from the surface. The sections are stained in freshly prepared ruthenium tetraoxide staining solution for 30 seconds. The microscopy studies may be performed on an electron microscope such as a Technai G2. Digital image acquisition may be performed using a camera such as a Gatan Model 791 side mount camera. Images may be analyzed using image analysis software such as Clemex Vision PE to determine the average diameter or the particle area. Only particles that have boundaries completely within the viewing area are included in the analysis. The analysis and average values are based on at least 100 particles.

The intrinsic viscosity of the poly(arylene ether) and the melt flow index of the polyolefin can have an impact on the morphology of the composition. In some embodiments, the poly(arylene ether) or combination of poly(arylene ether)s has an intrinsic viscosity greater than 0.3 dl/g as measured in chloroform at 25° C. and the polyolefin has a melt flow rate of 0.8 to 15 grams per ten minutes when determined according to ASTM D1238. When the poly(arylene ether) or combination of poly(arylene ethers) has an intrinsic viscosity less than 0.25 dl/g, the composition can demonstrate decreased heat aging.

As used herein, a "poly(arylene ether)" comprises a plurality of structural units of the formula (I):

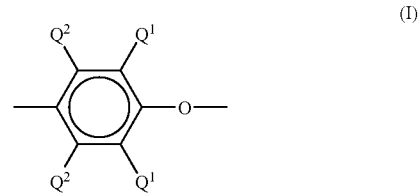

wherein for each structural unit, each $Q^1$ and $Q^2$ is independently hydrogen, halogen, primary or secondary lower alkyl (e.g., an alkyl containing 1 to about 7 carbon atoms), phenyl, haloalkyl, aminoalkyl, alkenylalkyl, alkynylalkyl, hydrocarbonoxy, aryl and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In some embodiments, the poly(arylene ether) comprises a capped poly(arylene ether). The terminal hydroxy groups may be capped with a capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable extent up to 80 percent, more specifically up to about 90 percent, and even more specifically up to 100 percent of the hydroxy groups are capped. Suitable capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount f aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkyl-benzamine(salicylamide). The removal of the amino group and the capping provides a poly(arylene ether) that is more stable to high temperatures, thereby resulting in fewer degradative products, such as gels or black specks, during processing of the poly(arylene ether).

The poly(arylene ether) can have a number average molecular weight of about 3,000 to about 40,000 grams per mole (g/mol) and a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an intrinsic viscosity greater than 0.25 deciliters per gram (dl/g), as measured in chloroform at 25° C. The intrinsic viscosity of the poly(arylene ether) used in making the thermoplastic composition (initial intrinsic viscosity) can differ from the intrinsic viscosity of the poly(arylene ether) in the thermoplastic composition (final intrinsic viscosity). Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two intrinsic viscosities are used, will depend somewhat on the exact intrinsic viscosities of the poly(arylene ether) used and the ultimate physical properties that are desired.

The poly(arylene ether) may have a hydroxy end group content of less than or equal to 6300 parts per million based on the total weight of the poly(arylene ether) (ppm) as determined by Fourier Transform Infrared Spectrometry (FTIR). In some embodiments the poly(arylene ether) may have a hydroxy end group content of less than or equal to 3000 ppm, or, more specifically, less than or equal to 1500 ppm, or, even more specifically, less than or equal to 500 ppm.

The poly(arylene ether) may be substantially free of visible particulate impurities. In some embodiments, the poly(arylene ether) is substantially free of particulate impurities greater than about 15 micrometers. As used herein, the term "substantially free of visible particulate impurities" when applied to poly(arylene ether) means that a ten gram sample of a polymeric material dissolved in fifty milliliters of chloroform ($CHCl_3$) exhibits fewer than 5 visible specks when viewed in a light box. Particles visible to the naked eye are typically those greater than 40 micrometers in diameter. As used herein, the term "substantially free of particulate impurities greater than about 15 micrometers" means that of a forty gram sample of polymeric material dissolved in 400 milliliters of $CHCl_3$, the number of particulates per gram having a size of about 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

The composition may comprise the poly(arylene ether) in an amount of 5 to 50 weight percent (wt %), based on the weight of the total composition. Within this range the amount of poly(arylene ether) may be greater than or equal to about 15 wt %, or, more specifically, greater than or equal to about 35 wt %. Also within this range the amount of poly(arylene ether) may be less than or equal to about 45 wt %, more specifically, less than or equal to about 40 wt %

Polyolefins are of the general structure: $C_nH_{2n}$ and include polyethylene (HDPE, LDPE, MDPE, LLDPE) polypropylene and polyisobutylene with exemplary homopolymers being atactic polypropylene, and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334. In some embodiments the polyolefin consists essentially of a polyolefin homopolymer, or, more specifically, a crystalline polyolefin homopolymer. The density of polyethylene (HDPE, LDPE, MDPE, LLDPE) can be 0.90 gram/$cm^3$ to 0.98 gram/$cm^3$.

Copolymers of polyolefins may also be used such copolymers of polypropylene with rubber and polyethylene with rubber. Additionally copolymers include copolymers such as ethylene octane rubber. These are sometimes referred to as impact modified polypropylene. Such copolymers are typically heterophasic and have sufficiently long sections of each component to have both amorphous and crystalline phases. In some embodiments the polyolefin comprises a polyolefin block copolymer with end group consisting essentially of a polyolefin homopolymer of $C_2$ to $C_3$ olefins and a middle block comprising a copolymer of $C_2$-$C_{12}$ olefins. Additionally the polyolefin may comprise a combination of homopolymer and copolymer, a combination of homopolymers having different melt temperatures, and/or a combination of homopolymers having a different melt flow rate.

In some embodiments, the polyolefin comprises a high density polyethylene (HDPE). The high density polyethylene can have a density of 0.941 to 0.965 grams per milliliter.

In some embodiments, the polyolefin comprises a medium density polyethylene (MDPE). The medium density polyethylene can have a density of 0.921 to 0.94 grams per milliliter.

In some embodiments, the polyolefin comprises a mixture of medium density polyethylene (MDPE) and a high density polyethylene (HDPE).

In some embodiments, the polyolefin has a melt flow rate (MFR) of about 0.3 to about 10 grams per ten minutes (g/10 min). Specifically, the melt flow rate can be about 0.3 to about 5 g/10 min. Melt flow rate can be determined according to ASTM D1238 using either powdered or pelletized polyolefin, a load of 2.16 kilograms and a temperature suitable for the resin (190° C. for ethylene based resins and 230° C. for propylene based resins).

In some embodiments, the polyolefin comprises polyethylene homo polyethylene or a polyethylene copolymer. Additionally the polyethylene may comprise a combination of homopolymer and copolymer, a combination of homopolymers having different melting temperatures, and/or a combination of homopolymers having a different melt flow rate. The polyethylene can have a density of 0.911 grams per cubic centimeter to 0.98 grams per cubic centimeter.

In some embodiments, a mixture of different types of polyolefin can be used.

In some embodiments, a mixture of polyethylenes with different densities can be used.

The composition may comprise the polyolefin in an amount of 1 to 80 weight percent (wt %), based on the total weight of the thermoplastic composition. Within this range the amount of polyolefin may be greater than or equal to 5 wt %, or, more specifically, greater than or equal to about 10 wt % or, more specifically, greater than or equal to about 20 wt %. Also within this range the amount of polyolefin may be less than or equal to about 70 wt %, or, more specifically, less than or equal to about 60 wt % or, more specifically, less than or equal to about 45 wt %.

In some embodiments, when the compositions comprise greater than or equal to 15 weight percent polyethylene, based on the total weight of the composition, the compositions can be essentially free of a polypropylene. Essentially free is defined as containing less than 10 weight percent (wt %), or, more specifically less than 7 wt %, or, more specifically less than 5 wt %, or, even more specifically less than 3 wt % of a polypropylene resin, based on the total weight of composition.

The thermoplastic composition comprises a styrenic resin. Styrenic resins include homopolymers and copolymers of alkenyl aromatic monomers. As used herein the term "copolymer of alkenyl aromatic monomers" refers to a copolymer of monomers consisting of two or more different alkenyl aromatic monomers. Homopolymers of alkenyl aromatic monomers include polystyrenes, including atactic and syndiotactic polystyrenes. The copolymers of alkenyl aromatic monomers include random copolymers of two or more monomers selected from the group consisting of styrene, methylstyrenes, and t-butylstyrenes. The copolymers of alkenyl aromatic monomers also include rubber modified polystyrene resin (also known as high impact polystyrene or HIPS). The copolymers of alkenyl aromatic monomers also include block copolymers (as defined as "styrenic block copolymer" thereafter). The homopolymers and copolymers of alkenyl aromatic monomers, when present, can be used in an amount of 1 to 60 weight percent, specifically 10 to 40 weight percent, based on the total weight of the thermoplastic composition.

In some embodiments, when the compositions comprise greater than or equal to 30 weight percent polyolefin, based on the total weight of the composition, the compositions can be essentially free of an poly(alkenyl aromatic) resin such as polystyrene or rubber-modified polystyrene (also known as high impact polystyrene or HIPS). Essentially free is defined as containing less than 10 weight percent (wt %), or, more specifically less than 7 wt %, or, more specifically less than 5 wt %, or, even more specifically less than 3 wt % of an alkenyl aromatic resin, based on the total weight of composition.

A styrenic block copolymer is a copolymer comprising (A) at least one block comprising repeating aryl alkylene units and (B) at least one block comprising repeating alkylene units. The arrangement of blocks (A) and (B) may be a linear structure or a so-called radial teleblock structure having branched chains. A-B diblock copolymers and A-B-A triblock copolymers have one or two blocks A comprising repeating aryl alkylene units. The pendant aryl moiety may be polycyclic and may have a substituent at any available position on the cyclic portion. Suitable substituents include alkyl groups having 1 to 4 carbons. An exemplary aryl alkylene unit is phenylethylene, which is shown in Figure I:

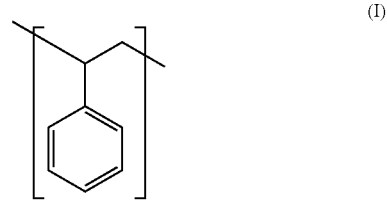

(I)

Block A may further comprise alkylene units having 2 to 15 carbons as long as the quantity of aryl alkylene units exceeds the quantity of alkylene units. Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units. Each occurrence of block A may have a molecular weight which is the same or different than other occurrences of block A. Similarly each occurrence of block B may have a molecular weight which is the same or different than other occurrences of block B.

The repeating aryl alkylene units result from the polymerization of aryl alkylene monomers such as styrene. The repeating alkylene units result from the hydrogenation of repeating unsaturated units such as butadiene. The butadiene may comprise 1,4-butadiene and/or 1,2-butadiene. The B block may further comprise some unsaturated carbon-carbon bonds.

In some embodiments the composition, in addition to the poly(arylene ether) and the polyolefin, the composition comprises a hydrogenated styrenic block copolymer of an alkenyl aromatic compound and a conjugated diene. This hydrogenated styrenic block copolymer has a poly(alkenyl aromatic) content of about 10 to 45 weight percent, based on the total weight of the hydrogenated block copolymer. Specifically, the poly(alkenyl aromatic) content can be about 10 to about 40 weight percent, or about 10 to about 35 weight percent. The hydrogenated block copolymer may have a weight average molecular weight greater than or equal to 200,000 atomic mass units. As noted above, this molecular weight is determined by gel permeation chromatography and based on comparison to polystyrene standards. In some embodiments, the hydrogenated block copolymer has a weight average molecular weight of 200,000 to about 400,000 atomic mass units, specifically 220,000 to about 350,000 atomic mass units. Methods for making high molecular weight hydrogenated block copolymers are known in the art and described, for example, in U.S. Pat. No. 3,431,323 to Jones. High molecular weight hydrogenated block copolymers are also commercially available as, for example, the polystyrene-poly(ethylene/butylene)-polystyrene triblock copolymer having a styrene content of 31 weight percent based and a weight average molecular weight of about 240,000 to about 301,000 atomic mass units (AMU) available from Kraton Polymers as KRATON G 1651.

In some embodiments, the composition may comprise a first styrenic block copolymer and a second styrenic block copolymer. The first styrenic block copolymer has an aryl alkylene content greater than or to equal to 50 weight percent based on the total weight of the first styrenic block copolymer. The styrenic second block copolymer has an aryl alkylene content less than 50 weight percent based on the total weight of the styrenic second block copolymer. The styrenic first block copolymer, the second styrenic block copolymer or both the first and second styrenic block copolymers may be a blend of diblock and triblock copolymers. An exemplary combination of block copolymers is a polystyrene-poly(ethylene/butylene)-polystyrene having a styrenic content of 15 weight percent to 40 weight percent, based on the total weight of the block copolymer and a polystyrene-poly(ethylene-butylene)-polystyrene having a styrenic content of 55 weight percent to 70 weight percent, based on the total weight of the block copolymer may be used. Exemplary styrenic block copolymers having an aryl alkylene content greater than 50 wt % are commercially available from Asahi under the trademark TUFTEC and have grade names such as H1043, as well as some grades available under the tradename SEPTON from Kuraray. Exemplary styrenic block copolymers having an aryl alkylene content less than 50 wt % are commercially available from Kraton Polymers under the trademark KRATON and have grade names such as G-1701, G-1702, G-1730, G-1641, G-1650, G-1651, G-1652, G-1657, A-RP6936 and A-RP6935. In some embodiments the first and second styrenic block copolymers are both triblock copolymers.

In some embodiments the styrenic block copolymer(s) have a number average molecular weight of 5,000 to 1,000,000 grams per mole (g/mol), as determined by gel permeation chromatography (GPC) using polystyrene standards. Within this range, the number average molecular weight may be at least 10,000 g/mol, or, more specifically, at least 30,000 g/mol, or, even more specifically, at least 45,000 g/mol. Also within this range, the number average molecular weight may preferably be up to 800,000 g/mol, or, more specifically, up to 700,000 g/mol, or, even more specifically, up to 650,000 g/mol The conjugated diene used to prepare the hydrogenated block copolymer can be a $C_4$-$C_{20}$ conjugated diene. Suitable conjugated dienes include, for example, 1,3 butadiene, 2 methyl-1,3-butadiene, 2-chloro-1,3-butadiene, 2,3 dimethyl 1,3 butadiene, 1,3-pentadiene, 1,3-hexadiene, and the like, and combinations thereof. In some embodiments, the conjugated diene is 1,3-butadiene, 2 methyl-1,3-butadiene, or a combination thereof. In some embodiments, the conjugated diene consists of 1,3-butadiene.

The hydrogenated styrenic block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure with or without a branched chain. Linear styrenic block copolymers include tapered linear structures and non tapered linear structures. In some embodiments, the hydrogenated styrenic block copolymer has a tapered linear structure. Method of preparing tapered block copolymers, which may also be referred to as controlled distribution block copolymers, are described, for example, in U.S. Patent Application No. US 2003/181584 A1 of Handlin et al. Suitable tapered block copolymers are also commercially available as, for example, KRATON A RP6936 and KRATON A RP6935 from Kraton Polymers. In some embodiments, the hydrogenated styrenic block copolymer has a non-tapered linear structure. In some embodiments, the hydrogenated styrenic block copolymer comprises a B block that comprises random incorporation of alkenyl aromatic monomer. Linear styrenic block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated styrenic block copolymer is a diblock copolymer, a triblock copolymer, or a combination thereof.

In some embodiments, the hydrogenated styrenic block copolymer may be functionalized with acid and or amine moiety.

Illustrative commercially available hydrogenated styrenic block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polybutadiene block copolymer available from Asahi Kasei Elastomer as S.O.E.-SS L601; the hydrogenated radial block copolymers available from Chevron Phillips Chemical Company as K Resin KK38, KR01, KR03, and KR05; the polystyrene-poly(ethylene-butylene)-polystyrene triblock copolymer comprising about 60 weight polystyrene available from Kuraray as SEPTON S8104; the polystyrene poly(ethylene ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more block copolymers may be used. Illustrative commercially available unhydrogenated block copolymers include the KRATON® D series polymers, including KRATON® D1101 and D1102, from Kraton Polymers, and the styrene butadiene radial teleblock copolymers available as, for example, K-RESIN KR01, KR03, KR05, and KR10 sold by Chevron Phillips Chemical Company.

In some embodiments, one or more types of the styrenic block copolymers can be used together. The styrenic block copolymer or combination of styrenic block copolymers may be present in the composition in an amount of 1 to 60 weight percent, based on the total weight of the composition. Within this range the styrenic block copolymer or combination of styrenic block copolymer may be present in an amount greater than or equal to 5, or, more specifically, greater than or equal to 15 weight percent based on the total weight of composition. Also within this range, the styrenic block copolymer or combination of styrenic block copolymer may be present in an amount less than or equal to 55, or, more specifically, less than or equal to 40, or, even more specifically, less than or equal to 30 weight percent based on the total weight of the composition.

There is no limitation on the type of compatibilizer. In some embodiments, the compatibilizer comprises a polymer compatibilizer selected from a group consists of (i) a combination of diblock and triblock styrenic block copolymers, (ii) a styrenic block copolymer wherein a central block is a controlled distribution copolymer (iii) a polypropylene-polystyrene graft copolymer and (iv) a styrenic block copolymer has an aryl alkylene content greater than or to equal to 50 weight percent based on the total weight of the first block copolymer and mixtures thereof. The polymeric compatibilizer may be different from or inclusive of the styrenic resin, in particular, the styrenic block copolymer.

In compositions in which the poly(arylene ether) is not the continuous phase, or co-continuous phase, the polymer compatibilizer is present in an amount sufficient to result in the formation of dispersed poly(arylene ether) particles having an average diameter less than 5 micrometers and/or an average particle area less than or equal to 4 square micrometers ($\mu m^2$). In some embodiments, the polymer compatibilizer may be present in the composition in an amount of 0 to 30 weight percent, based on the combined weight of the total composition. Within this range the combination of block copolymers may be present in an amount greater than or equal to 5, or, more specifically, greater than or equal to 10 weight percent based on the combined total weight of the composition.

The detailed description of the polymer compatibilizer can be found in U.S Patent Publication Nos. 20060135661 and 20060135695 that are incorporated herein by reference by their entirety.

There is no particular restriction on the types of flame retardants that may be used except that the flame retardant is suitably stable at the elevated temperatures employed during processing and free of chlorine and bromine. Exemplary flame retardants include melamine (CAS No. 108-78-1), melamine cyanurate (CAS No. 37640-57-6), melamine phosphate (CAS No. 20208-95-1), melamine pyrophosphate (CAS No. 15541-60-3), melamine polyphosphate (CAS No. 218768-84-4), melam, melem, melon, zinc borate (CAS No. 1332-07-6), boron phosphate, red phosphorous (CAS No. 7723-14-0), organophosphate esters, monoammonium phosphate (CAS No. 7722-76-1), diammonium phosphate (CAS No. 7783-28-0), alkyl phosphonates (CAS No. 78-38-6 and 78-40-0), metal dialkyl phosphinate, ammonium polyphosphates (CAS No. 68333-79-9), low melting glasses and combinations of two or more of the foregoing flame retardants.

In some embodiments, the composition comprises a flame retardant selected from the group consisting of an organophosphate ester, a metal dialkyl phosphinate, a nitrogen-containing flame retardant, metal hydroxides and mixtures thereof. The amount of the flame retardant, when present in the thermoplastic composition, is sufficient for the covered conductor, when tested according to the flame propagation procedure contained in the ISO 6722, to have a flame out time less or equal to 70 seconds. In some embodiments, the flame retardant may be present in an amount of 1 to 35 weight percent (wt. %), with respect to the total weight of the composition. Within this range the amount of flame retardant can be greater than or equal to 5 wt. %, or more specifically, greater than or equal to 10 wt. %. Also within this range the amount of flame retardant can be less than or equal to 30 wt. %, or, more specifically, less than or equal to 25 wt. %.

Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis-diphenylphosphate, as well as those based upon bis-phenols such as, for example, bis-phenol A bis-diphenylphosphate. In some embodiments, the organophosphate ester is selected from tris(alkylphenyl)phosphate (for example, CAS No. 89492-23-9 or CAS No. 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropylphenyl) phosphate (for example, CAS No. 68937-41-7) and mixtures of two or more of the foregoing organophosphate esters.

In some embodiments the organophosphate ester comprises a bis-aryl phosphate of Formula III:

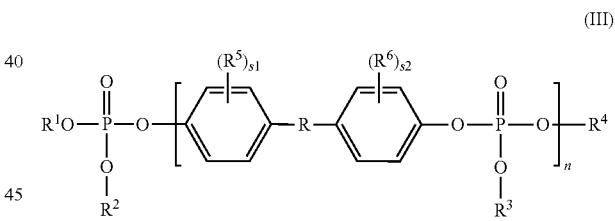

(III)

wherein R, $R^5$ and $R^6$ are independently at each occurrence an alkyl group having 1 to 5 carbons and $R^1$-$R^4$ are independently an alkyl, aryl, arylalkyl or alkylaryl group having 1 to 10 carbons; n is an integer equal to 1 to 25; and s1 and s2 are independently an integer equal to 0 to 2. In some embodiments $OR^1$, $OR^2$, $OR^3$ and $OR^4$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In some embodiments, the bisphenol comprises bisphenol A.

Organophosphate esters can have differing molecular weights making the determination of the amount of different organophosphate esters used in the thermoplastic composition difficult. In some embodiments the amount of phosphorus, as the result of the organophosphate ester, is 0.8 weight percent to 1.2 weight percent with respect to the total weight of the composition.

The amount of the flame retardant, when present in the thermoplastic composition, is sufficient for the covered conductor to pass the relevant flame retardance standard to the type of covered conductor. For example, when the covered conductor is an covered conductor the amount of flame retardant is sufficient for the covered conductor to have a flame out time less than or equal to 70 seconds, when tested according to the flame propagation procedure contained in ISO 6722.

In some embodiments, the flame retardant comprises an organophosphate ester in an amount of 5 to 30 weight percent (wt. %), with respect to the total weight of the composition. Within this range the amount of organophosphate ester can be greater than or equal to 7 wt. %, or more specifically, greater than or equal to 10 wt. %. Also within this range the amount of organophosphate ester can be less than or equal to 25 wt. %, or, more specifically, less than or equal to 20 wt. %.

In some embodiments, the flame retardant comprises a metal dialkyl phosphinate. As used herein, the term "metal dialkyl phosphinate" refers to a salt comprising at least one metal cation and at least one dialkyl phosphinate anion. In some embodiments, the metal dialkyl phosphinate has the formula:

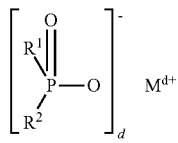

wherein $R^1$ and $R^2$ are each independently $C_1$-$C_6$ alkyl; M is calcium, magnesium, aluminum, or zinc; and d is 2 or 3. Examples of $R^1$ and $R^2$ include methyl, ethyl, n-propyl, isopropyl, n-butyl, tert-butyl, n-pentyl, and phenyl. In some embodiments, $R^1$ and $R^2$ are ethyl, M is aluminum, and d is 3 (that is, the metal dialkyl phosphinate is aluminum tris(diethyl phosphinate)).

In some embodiments, the metal dialkyl phosphinate is in particulate form. The metal dialkyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, a block copolymer, or combination thereof, to form a masterbatch. The metal dialkyl phosphinate masterbatch comprises the metal dialkyl phosphinate in an amount greater than is present in the thermoplastic composition. Employing a masterbatch for the addition of the metal dialkyl phosphinate to the other components of the thermoplastic composition can facilitate addition and improve distribution of the metal dialkyl phosphinate.

In some embodiments, the flame retardant comprises a metal dialkyl phosphinate present in an amount of 0 to 20 weight percent (wt. %), with respect to the total weight of the composition. Within this range the amount of metal dialkyl phosphinate can be greater than or equal to 2 wt. %, or more specifically, greater than or equal to 5 wt. %. Also within this range the amount of organophosphate ester can be less than or equal to 15 wt. %, or, more specifically, less than or equal to 10 wt. %.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

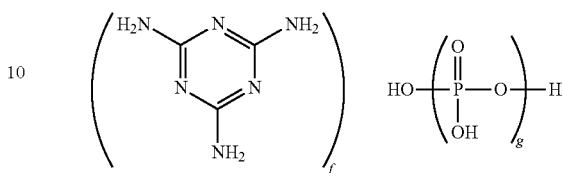

wherein g is 1 to about 10,000 and the ratio of f to g is about 0.5:1 to about 1.7:1, specifically 0.7:1 to 1.3:1, more specifically 0.9:1 to 1.1:1. It will be understood that this formula includes species in which one or more protons are transferred from the polyphosphate group to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to about 10,000, specifically about 5 to about 1,000, more specifically about 10 to about 500. In some embodiments in which the nitrogen-containing flame retardant is melamine polyphosphate, g has an average value of greater than 2 to about 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025, 419 to Kasowski et al., or by heating melamine pyrophosphate under nitrogen at 290° C. to constant weight, as described in International Patent Application No. WO 98/08898 A1 to Jacobson et al.

The nitrogen-containing flame retardant can have a low volatility relative to temperatures. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a nitrogen-containing flame retardant present in an amount of 0 to 20 weight percent (wt. %), with respect to the total weight of the composition. Within this range the amount of nitrogen-containing flame retardant can be greater than or equal to 2 wt. %, or more specifically, greater than or equal to 5 wt. %. Also within this range the amount of organophosphate ester can be less than or equal to 15 wt. %, or, more specifically, less than or equal to 10 wt. %.

In some embodiments, the flame retardant may comprise metal hydroxides. Suitable metal hydroxides include all those capable of providing fire retardance, as well as combinations thereof. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardance. Exemplary metal hydroxides include, but are not limited to, magnesium hydroxide (for example, CAS No. 1309-42-8), aluminum hydroxide (for example, CAS No. 21645-51-2), cobalt hydroxide (for example, CAS No. 21041-93-0) and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, i.e. a weight loss of less than 1 weight percent upon drying at 120° C. for 1 hour. In some embodiments the metal hydroxide can be coated, for example, with stearic acid or other fatty acid.

The flame retardant can comprise the metal hydroxide in an amount of 0 to 35 weight percent, based on the total weight of the composition. Within this range the metal hydroxide can be present in an amount greater than or equal to 10, or, more specifically, greater than or equal to 15, or, even more specifically, greater than or equal to 20 weight percent based on the total weight of the composition. Also within this range the metal hydroxide can be present in an amount less than or equal to 30, or, more specifically, less than or equal to 25 weight percent based on the total weight of the composition.

In some embodiments the composition is contains less than 0.1 weight percent polysiloxane, or, more specifically, less than 0.05 weight percent polysiloxane.

Additionally, the composition may optionally also contain various additives, such as antioxidants; fillers and reinforcing agents having an average particle size less than or equal to 10 micrometers, such as, for example, silicates, $TiO_2$, fibers, glass fibers, glass spheres, calcium carbonate, talc, and mica; mold release agents; UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. The loading of these additives can vary from 0.01 to 5 weight percent based on the total composition A method for making the thermoplastic composition comprises melt mixing (compounding) the components, typically in a melt mixing device such as an compounding extruder or Banbury mixer. In some embodiments, the poly(arylene ether), styrenic block copolymers, and polyolefin are simultaneously melt mixed. In another embodiment, the poly (arylene ether), styrenic block copolymers, and optionally a portion of the polyolefin are melt mixed to form a first melt mixture. Subsequently, the polyolefin or remainder of the polyolefin is further melt mixed with the first melt mixture to form a second melt mixture. Alternatively, the poly(arylene ether) and a portion of the styrenic block copolymers may be melt mixed to form a first melt mixture and then the polyolefin and the remainder of the styrenic block copolymers are further melt mixed with the first melt mixture to form a second melt mixture.

The aforementioned melt mixing processes can be achieved without isolating the first melt mixture or can be achieved by isolating the first melt mixture. One or more melt mixing devices including one or more types of melt mixing devices can be used in these processes. In some embodiments, some components of the thermoplastic composition that forms the covering may be introduced and melt mixed in an extruder used to coat the conductor.

The method and location of the addition of the flame retardant is typically dictated by the identity and physical properties, e.g., solid or liquid, of the flame retardant as well understood in the general art of polymer alloys and their manufacture. In some embodiments, the flame retardant is combined with one of the components of the thermoplastic composition, e.g., a portion of the polyolefin, to form a concentrate that is subsequently melt mixed with the remaining components.

The poly(arylene ether), styrenic block copolymers, polyolefin and flame retardant are melt mixed at a temperature greater than or equal to the glass transition temperature of the poly(arylene ether) but less than the degradation temperature of the polyolefin. For example, the poly(arylene ether), styrenic block copolymers, polyolefin and flame retardant may be melt mixed at an extruder temperature of 240° C. to 320° C., although brief periods in excess of this range may occur during melt mixing. Within this range, the temperature may be greater than or equal to 250° C., or, more specifically, greater than or equal to 260° C. Also within this range the temperature may be less than or equal to 310° C., or, more specifically, less than or equal to 300° C.

After some or all the components are melt mixed, the molten mixture can be melt filtered through one of more filters. In some embodiments the one or more filters have openings with diameters of 20 micrometers to 150 micrometers. Within this range, the openings may have diameters less than or equal to 130 micrometers, or, more specifically, less than or equal to 110 micrometers. Also within this range the openings can have diameters greater than or equal to 30 micrometers, or, more specifically, greater than or equal to 40 micrometers.

In some embodiments, the filter openings have a maximum diameter that is less than or equal to half of the thickness of the covering that will be applied to the conductor. For example, if the covered conductor has a covering with a thickness of 200 micrometers, the filter openings have a maximum diameter less than or equal to 100 micrometers.

Any suitable melt filtration system or device that can remove particulate impurities from the molten mixture may be used. In some embodiments the melt is filtered through a single melt filtration system. Multiple melt filtration systems are also contemplated.

Suitable melt filtration systems include filters made from a variety of materials such as, but not limited to, sintered-metal, metal mesh or screen, fiber metal felt, ceramic, or a combination of the foregoing materials, and the like. Particularly useful filters are sintered metal filters exhibiting high tortuosity, including the sintered wire mesh filters prepared by Pall Corporation and Martin Kurz & Company, Inc.

In some embodiments the melt filtered mixture is passed through a die head and pelletized by either strand pelletization or underwater pelletization. The pelletized material may be packaged, stored and transported. In some embodiments the pellets are packaged into metal foil lined plastic bags, typically polypropylene bags, or metal foil lined paper bags. Substantially all of the air can be evacuated from the pellet filled bags.

In some embodiments, the thermoplastic composition is substantially free of visible particulate impurities. Visible particulates or "black specks" are dark or colored particulates generally visible to the human eye without magnification and having an average diameter of 40 micrometers or greater. Although some people are able to without magnification visually detect particles having an average diameter smaller than 30 micrometers and other people can detect only particles having an average diameter larger than 40 micrometers, the terms "visible particles," "visible particulates," and "black specks" when used herein without reference to a specified average diameter means those particulates having an average diameter of 40 micrometers or greater. As used herein, the term "substantially free of visible particulate impurities" when applied to the thermoplastic composition means that when the composition is injection molded to form 5 plaques having dimensions of 75 millimeters×50 millimeters and having a thickness of 3 millimeters and the plaques are visually inspected for black specks with the naked eye the total number of black specks for all five plaques is less than or equal to 100, or, more specifically, less than or equal to 70, or, even more specifically, less than or equal to 50.

In some embodiments the pellets are melted and the composition applied to the conductor by a suitable method such as extrusion coating to form an covered conductor. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments, the composition is applied to the conductor to form a covering disposed over the conductor. Additional layers may be applied to the covering.

In some embodiments the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

In some embodiments the conductor has the conductor has a cross-section that meets as least one of following: (i) American Wire Gauge (AWG) of AWG 24 to AWG 5, (ii) a cross-section area of 0.20 to 16.8 mm$^2$ (corresponding to AWG 24 to AWG 5 according to ASTM B258-02); (iii) a nominal diameter from 0.51 to 4.62 mm (corresponding to AWG 24 to AWG 5 according to UL 1581, 4th edition, Table 20.1).

In some embodiments, a covered conductor comprising: a conductor; and a covering comprising a thermoplastic composition wherein the covered conductor essentially meets the performance requirement of ISO 6722, wherein the covering is disposed over the conductor and wherein, the covering has a thickness from about 0.25 to about 8 mm.

In some embodiments it may be useful to dry the thermoplastic composition before extrusion coating. Exemplary drying conditions are 60-90° C. for 2-20 hours. Additionally, in some embodiments, during extrusion coating, the thermoplastic composition is melt filtered, prior to formation of the coating, through one or more filters having opening diameters of 20 micrometers to 150 micrometers. Within this range, the openings diameters may be greater than or equal to 30 micrometers, or more specifically greater than or equal to 40 micrometers. Also within this range the openings diameters may be less than or equal to 130 micrometers, or, more specifically, less than or equal to 110 micrometers. The coating extruder may comprise one or more filters as described above.

In some embodiments, during extrusion coating, the thermoplastic composition is melt filtered, prior to formation of the coating, through one or more filters having opening diameters wherein the filter openings have a maximum diameter that is less than or equal to half of the thickness of the covering that will be applied to the conductor.

In another embodiment the melt filtered mixture produced by melt mixing is not pelletized. Rather the molten melt filtered mixture is formed directly into a coating for the conductor using a coating extruder that is in tandem with the melt mixing apparatus, typically a compounding extruder. The coating extruder may comprise one or more filters as described above.

In some embodiments, it is contemplated that a sheet of the thermoplastic composition is made separately. Multiple conductors will be line in parallel between two of the sheet of the thermoplastic composition and pressed together to make a so-called "Ribbon wires".

It is contemplated that in some embodiments the thermoplastic composition may be extruded or otherwise formed into a tube that will provide a covering. The conductor and optional intervening layer may be inserted into the tube to form the covered conductor.

A color concentrate or masterbatch may be added to the composition prior to or during the extrusion coating. When a color concentrate is used it is typically present in an amount less than or equal to 3 weight percent, based on the total weight of the composition. In some embodiments dye and/or pigment employed in the color concentrate is free of chlorine, bromine, and fluorine. As appreciated by one of skill in the art, the color of the composition prior to the addition of color concentrate may impact the final color achieved and in some cases it may be advantageous to employ a bleaching agent and/or color stabilization agents. Bleaching agents and color stabilization agents are known in the art and are commercially available.

The extruder temperature during extrusion coating is generally less than or equal to 320° C., or, more specifically, less than or equal to 310° C., or, more specifically, less than or equal to 290° C. Additionally the processing temperature is adjusted to provide a sufficiently fluid molten composition to afford a covering for the conductor, for example, higher than the melting point of the thermoplastic composition, or more specifically at least 10° C. higher than the melting point of the thermoplastic composition.

After extrusion coating the covered conductor is usually cooled using a water bath, water spray, air jets, or a combination comprising one or more of the foregoing cooling methods. Exemplary water bath temperatures are 20 to 85° C.

Alternatively the composition may be molded or extruded to form articles such as sheets or trays when it is desirable for such articles to have combination of chemical resistance, heat aging, abrasion resistance and impact strength.

The composition and covered conductor are further illustrated by the following non-limiting examples.

EXAMPLES

The following examples were prepared using the materials listed in Table 1.

TABLE 1

| Component | Description |
| --- | --- |
| PPE-0.33 IV | A poly(2,6-dimethylphenylene ether) having an intrinsic viscosity of 0.33 dl/g as measured in chloroform at 25° C. and commercially available from General Electric. |
| PPE-0.46 IV | A poly(2,6-dimethylphenylene ether) with an intrinsic viscosity of 0.46 dl/g as measured in chloroform at 25° C. commercially available from General Electric |

TABLE 1-continued

| Component | Description |
|---|---|
| KG1650 | A polyphenylethylene-poly(ethylene/butylene)-polyphenylethylene block copolymer having a phenylethylene content of 32 weight percent, based on the total weight of the block copolymer and commercially available from Kraton Polymers. |
| KG1701 | A polyphenylethylene-poly(ethylene/propylene)-polyphenylethylene block copolymer commercially available from Kraton Polymers. |
| PP | A polypropylene having a melt flow rate of 1.5 g/10 min determined according to ASTM D1238 as described above and commercially available from Sunoco Chemicals under the tradename D-015-C2. |
| Tuftec H1043 | A polyphenylethylene-poly(ethylene/butylene)-polyphenylethylene block copolymer having a phenylethylene content of 67 weight percent, based on the total weight of the block copolymer and commercially available from Asahi Chemical |
| Tuftec H1051 | A polyphenylethylene-poly(ethylene/butylene)-polyphenylethylene block copolymer having a S/phenylethylene to ethylene/butylene ratio of 30/70 weight percent, based on the total weight of the block copolymer and commercially available from Asahi Chemical |
| BPADP | Tetraphenyl bisphenol A Diphosphate (CAS 181028-79-5) available from Supresta with specific gravity of 1.26 |
| PD403 | Propylene homopolymer with melt flow rate 0f 1.3 g/10 min at 230° C./2.16 kg available from Sunoco under trade name D015-C2 |
| HDPE 5305E | Ethylene copolymer with 1-hexene with melt index 0.7 and specific gravity of 0.943 available from Equistar under trade name Petrothene LR590000 |
| Tafmer A-0585S | Polyalphaolefin copolymer material made by Mitsui Chemicals. |
| ENGAGE 8180 | A polyolefin Elastomer of ethylene-octene copolymer made by Dow |
| Kraton A | A polyphenylethylene-(ethylene/propylene-phenylethylene)-polyphenylethylene copolymer commercially available from Kraton Polymers under the grade name RP6936 having a styrene content of 39 weight percent, based on the total weight of the block copolymer. |
| Petrothene GA837091 | Ethylene copolymer with 1-hexene available from Equistar with melt index of 0.7 and specific gravity of 0.934 |
| Petrothene GA818073 | Ethylene copolymer with 1-butene available from Equistar with melt index of 0.75 and specific gravity of 0.9205 |

Comparative Examples 1*-14*

Examples were made by combining the components in a twin screw extruder. The PPE and block copolymers were added at the feedthroat and the polyolefin was added downstream. The BPADP was added by a liquid injector in the second half of the extruder. The extruded material was injected molded into test specimens for physical property testing. The physical properties and their test methods are listed in Table 2. Testing according to ASTM D638-03 employed Type I samples injection molded using the same conditions as flexural modulus samples. Tensile elongation was measured at a speed of 50 millimeters per minute. Megapascals are abbreviated as MPa, Joules are abbreviated as J, Newtons are abbreviated as N, and meters are abbreviated as m. The deflection temperature and flexural modulus values are an average of 3 samples. The remaining values are an average of 5 samples. Table 3 contains formulations of comparative examples 1*-14*. Table 4 contains testing results of comparative examples 1*-14*.

TABLE 2

| Physical Property | Units | Test Method |
|---|---|---|
| Elongation at Yield-Avg | % | ASTM D638-03 |
| Elongation at Break-Avg | % | ASTM D638-03 |
| Stress at Break-Avg | MPa | ASTM D638-03 |
| Stress at Yield-Avg | MPa | ASTM D638-03 |
| Modulus of Elasticity | MPa | ASTM D638-03 |
| Deflection temp-Avg | ° C. | ASTM D648-04 |
| Energy to failure −23 C. Avg | J | ASTM D3763-02 |
| Energy to max load −23 C. Avg | J | ASTM D3763-02 |
| Max Load-Avg | N | ASTM D3763-02 |
| Energy to max load −30 C. | J | ASTM D3763-02 |
| Energy to failure −30 C. | J | ASTM D3763-02 |
| Max Load −30 C. | N | ASTM D3763-02 |
| Impact Strength Avg | J/m | ASTM D258-03 |
| Flexural Modulus Avg | MPa | ASTM D790-03 |
| MVR (at 5 kg and 280° C.) | cm³/10 min | ASTM D1238 |
| Flex Stress at 5% strain | MPa | ASTM D790-03 |
| Shore Hardness (D scale) | | ASTM D 2240 |

TABLE 3

| Component | 1* | 2* | 3* | 4* | 5* | 6* | 7* | 8* | 9* | 10* | 11* | 12* | 13* | 14* |
|---|---|---|---|---|---|---|---|---|---|---|---|---|---|---|
| PPE-0.33 IV | — | — | — | — | — | — | — | — | — | 50 | 50 | 50 | 50 | — |
| PPE-0.46 IV | 50 | 50 | 50 | 50 | 50 | 50 | 50 | 50 | 50 | — | — | — | — | 49 |
| PP PD 403 | 40 | 40 | 40 | 40 | 40 | 40 | 40 | 40 | 40 | 40 | 40 | 40 | 40 | 34 |
| KG1650 | 10 | — | — | 5 | — | 7.5 | 2.5 | — | — | 10 | — | — | 5 | 5 |
| Tuftec H1043 | — | 10 | — | 5 | 5 | 2.5 | 7.5 | 7.5 | 5 | — | 10 | — | 5 | 5 |

TABLE 3-continued

| Component | 1* | 2* | 3* | 4* | 5* | 6* | 7* | 8* | 9* | 10* | 11* | 12* | 13* | 14* |
|---|---|---|---|---|---|---|---|---|---|---|---|---|---|---|
| KG1701 | — | — | 10 | — | 5 | — | — | 2.5 | — | — | — | 10 | — | — |
| BPADP | — | — | — | — | — | — | — | — | — | — | — | — | — | 7 |

*Comparative examples

TABLE 4

| Property | 1* | 2* | 3* | 4* | 5* | 6* | 7* | 8* |
|---|---|---|---|---|---|---|---|---|
| Elongation at Yield-Avg | 8 | 8 | 4 | 9 | 8 | 23 | 14 | 13 |
| Elongation at Break-Avg | 59 | 98 | 4.0 | 100 | 22 | 108 | 99 | 71 |
| Stress at Break-Avg | 32.3 | 38.4 | 19.8 | 36.7 | 35.6 | 35.7 | 37.2 | 35.7 |
| Stress at Yield-Avg | 35.5 | 43.5 | 19.9 | 40.1 | 37.3 | 37.3 | 42.2 | 42.5 |
| Modulus of Elasticity | 2906 | 4118 | 1136 | 2762 | 3330 | 1309 | 1764 | 1842 |
| Deflection temp-Avg | 151 | 148 | 80 | 140 | 146 | 134 | 146 | 145 |
| Energy to failure −23 C. Avg | 25.2 | 40.1 | 29.2 | 37.8 | 36.0 | 37.1 | 42.0 | 41.2 |
| Energy to max load −23 C. Avg | 23.5 | 28.2 | 24.8 | 27.8 | 27.0 | 29.6 | 31.3 | 29.5 |
| Max Load-Avg | 3150 | 3600 | 2850 | 3450 | 3410 | 3550 | 3770 | 3740 |
| Energy to max load Avg −30 C. | 3.1 | 24.5 | 31.2 | 30.0 | 31.5 | 13.4 | 18.8 | 32.1 |
| Energy to failure Avg −30 C. | 3.4 | 25.6 | 36.9 | 31.6 | 36.1 | 14.2 | 19.7 | 35.1 |
| Max Load Avg −30 C. | 1406 | 4102 | 4144 | 4355 | 4469 | 2960 | 3240 | 4610 |
| Impact Strength Avg | 123 | 152 | 124 | 237 | 186 | 242 | 215 | 192 |
| Flexural Modulus Avg | 1430 | 1630 | 739 | 1490 | 1370 | 1150 | 1540 | 1580 |

| Property | 9* | 10* | 11* | 12* | 13* | 14* |
|---|---|---|---|---|---|---|
| Elongation at Yield-Avg | 16 | 15 | 7 | 5 | 11 | 12 |
| Elongation at Break-Avg | 170 | 79 | 100 | 6 | 120 | 120 |
| Stress at Break-Avg | 40.0 | 36.0 | 38.3 | 26.3 | 39.0 | 41.1 |
| Stress at Yield-Avg | 40.5 | 35.1 | 44.2 | 26.8 | 39.9 | 44.3 |
| Modulus of Elasticity | 1427 | 1500 | 2480 | 1392 | 1880 | 1602 |
| Deflection temp-Avg | 140 | 146 | 154 | 119 | 147 | 138 |
| Energy to failure −23 C. Avg | 42.6 | 41.0 | 43.4 | 32.5 | 44.3 | 42.2 |
| Energy to max load −23 C. Avg | 29.8 | 30.0 | 30.0 | 27.3 | 29.1 | 28.3 |
| Max Load-Avg | 3600 | 3510 | — | 3180 | 3570 | 3680 |
| Energy to max load −30 C. Avg | 31.6 | 17.7 | 10.5 | 29.9 | 30.9 | 22.5 |
| Energy to failure −30 C. Avg | 35.5 | 18.7 | 11.4 | 34.4 | 36.3 | 25.4 |
| Max Load −30 C. Avg | 4490 | 3545 | 2531 | 4280 | 4486 | 25 |
| Impact Strength Avg | 253 | 237 | 155 | 227 | 298 | 436 |
| Flexural Modulus Avg | 1250 | 1170 | 1620 | 1020 | 1370 | 1530 |

*Comparative examples

Comparative Examples 15*-16* and Inventive Examples 1-4

Examples were made by combining the components in a twin screw extruder. The PPE and block copolymers were added at the feedthroat and the polyolefin was added downstream. The BPADP was added by a liquid injector in the second half of the extruder. The extruded material was injection molded into test specimens for physical property testing. The physical properties and their test methods are listed in Table 2. Testing according to ASTM D638-03 employed Type I samples injection molded using the same conditions as flexural modulus samples. Tensile elongation was measured at a speed of 50 millimeters per minute. Megapascals are abbreviated as MPa, Joules are abbreviated as J, Newtons are abbreviated as N, and meters are abbreviated as m. The deflection temperature and flexural modulus values are an average of 3 samples. The deflection temperature data was collected at 1.82 MPa. The remaining values are an average of 5 samples. Table 5 contains formulations and test results of comparative examples 15*, 16* and inventive examples 1-4.

Covered conductors were produced using the compositions of Example 15*, 16* and Examples 1 to 4. The conductors had sizes of 2.0 square millimeters ($mm^2$). The thermoplastic composition was filtered through a 325 mesh and dried at 82° C. for 3-4 hours prior to extrusion with the conductive core to form the covered conductor. The coverings had thicknesses of 0.4 millimeters.

The covered conductors were tested for tensile elongation, tensile strength, abrasion resistance (7 Newton load), flame retardance, resistance to gasoline, resistance to hot water, short term heat aging (class C), long term heat aging (class A & B), thermal overload (class B), pressure at high temperatures. The covered conductors were also tested for fire retardance and hot water resistance. Testing was performed in accordance with ISO 6722. Additionally, the covered conductors were tested for bundle flexibility

TABLE 5

|  | 14* | 15* | 1 | 2 | 3 | 4 |
|---|---|---|---|---|---|---|
| PPE-0.46 IV | 52 | 52 | 36 | 40 | 40 | 40 |
| PD403 | 29 | — | — | — | — | — |
| HDPE 5305E | — | 17 | 35 | 35 | — | 18 |
| Tafmer A-0585S | — | — | — | — | — | — |
| ENGAGE 8180 | — | 10 | — | — | — | — |
| KG1650 | 5 | — | — | — | — | — |
| Tuftec H1043 | 5 | — | — | — | — | — |
| Kraton A | — | 3 | — | — | — | — |
| Tuftec H1051 | — | 7 | 17 | 13 | 13 | 13 |
| BPADP | 9 | 11 | 10 | 10 | 10 | 10 |
| Petrothene GA837091 | — | — | — | — | 35 | — |
| Petrothene GA818073 | — | — | — | — | — | 18 |
| Total | 100 | 100 | 98 | 98 | 98 | 99 |

TABLE 6

|  | 14* | 15* | 1 | 2 | 3 | 4 |
|---|---|---|---|---|---|---|
| Test performed on molded bar | | | | | | |
| MVR (5 kg/280° C.); cm$^3$/10 min | 13.8 | 20 | 42 | 42 | 45 | 44 |
| Flexural Modulus; MPa | 1550 | 1150 | 750 | 730 | 630 | 520 |
| Flex Stress@5% Strain MPa | — | — | 26 | 26 | 23 | 29 |
| Shore Hardness (D scale); % | 72 | 65 | 62 | 63 | 61 | 60 |
| Deflection temp (1.82 Mpa); ° C. | 92 | 84 | 56.3 | 57 | 56 | 55 |
| Impact Strength (RT, notched); J/m | 310 | 550 | 680 | 650 | 550 | 550 |
| Modulus of Elasticity (50 mm/min); MPa | 1710 | 1450 | 990 | 1040 | 850 | 730 |
| Stress at Yield Avg; MPa | 43 | 39 | 27 | 28 | 27 | 26 |
| Stress at Break Avg; MPa | 41 | 37 | 27 | 27 | 27 | 24 |
| Elongation at Yield Avg; % | 15 | 37 | 75 | 61 | 74 | 62 |
| Elongation at Break Avg; % | 83 | 45 | 90 | 84 | 77 | 65 |
| Test performed on covered conductor | | | | | | |
| Tensile Elongation; % | 118 | 72 | 150 | 126 | 117 | 115 |
| Tensile Strength; Mpa | 56.1 | 48.1 | 44 | 42.7 | 40.7 | 39.9 |
| 7 N Abrasion; # of cycles | >5000 | >5000 | >5000 | >5000 | >5000 | >5000 |
| Flame-out time average; seconds | 9 | 6 | 6 | 6 | 6 | 6 |
| Gasoline exposure | pass | pass | pass | pass | pass | pass |
| Thermal Overload (Class B) | pass | pass | pass | — | pass | Pass |
| Short-term heat-aging Class C | pass | pass | pass | — | pass | Pass |
| Long-term heat aging Class A&B | pass | pass | pass | — | pass | Pass |
| Pressure Test at High Temperature; highest passed class | C | C | — | — | B | B |
| Hot water exposure for 5 weeks | pass | fail | pass | pass | pass | pass |
| Bundle Flexibility; kgf | 19 | 15.2 | 14 | 13.8 | 12.5 | 12.7 |

Examples 1-4 have a surprisingly low flexural modulus without a significant loss in other properties and still meet the performance requirement of ISO 6722. For example, despite a decrease in the flexural modulus compared to Ex. 14* and 15*, Examples 1-4 still have excellent abrasion resistance.

In the specification and the claims, reference is made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A thermoplastic composition comprising: 35 to 45 weight percent of a poly(arylene ether) having an intrinsic viscosity greater than 0.25 dl/g as measured in chloroform at 25° C., 5 to 30 weight percent of a styrenic resin, and 20 to 45 weight percent of a polyolefin resin comprising a mixture of medium density polyethylene and a high density polyethylene, wherein weight percent is based on the total weight of the composition, the thermoplastic composition has a flexural modulus of 400-1000 Megapascals (MPa) as determined by ASTM D790-03, and comprises a continuous polyolefin phase and dispersed poly(arylene ether) particles and the poly(arylene ether) particles have an average diameter less than 5 micrometers.

2. The thermoplastic composition of claim 1 further comprising a flame retardant, a compatibilizer, or a combination of a flame retardant and a compatibilizer, wherein the compatibilizer is different from the styrenic resin.

3. The thermoplastic composition of claim 1, wherein the styrenic resin is a hydrogenated styrenic block copolymer having a poly(alkenyl aromatic) content of 10 to 45 weight percent.

4. A covered conductor comprising: a conductor and a covering disposed over the conductor, wherein the covering comprises a thermoplastic composition and the thermoplastic composition comprises 35 to 45 weight percent of a poly(arylene ether) having an intrinsic viscosity greater than 0.25 dl/g as measured in chloroform at 25° C., a styrenic resin, 5 to 30 weight percent of a polyolefin resin comprising a mixture of medium density polyethylene and a high density polyethylene selected from the group consisting of high density polyethylene and combinations of high density polyethylene, wherein weight percent is based on the total weight of the composition and the thermoplastic composition has a flexural modulus of 400-1000 Megapascals (MPa) as determined by ASTM D790-03 and comprises a continuous polyolefin phase and dispersed poly(arylene ether) particles and the poly(arylene ether) particles have an average diameter less than 5 micrometers and wherein the covered conductor essentially meets the performance requirement of ISO 6722, and the conductor has a cross-section that meets as least one of the following: (i) American Wire Gauge (AWG) of AWG 24 to AWG 5, (ii) a cross-section area of 0.20 to 16.8 $mm^2$ (corresponding to AWG 24 to AWG 5 according to ASTM B256-02); (iii) a nominal diameter from 0.51 to 4.62 mm (corresponding to AWG 24 to AWG 5 according to UL 1581, 4th edition, Table 20.1).

5. The covered conductor of claim 4, wherein the covering has a thickness of 0.25 to 8 mm.

6. The covered conductor of claim 4, wherein the thermoplastic composition further comprises a flame retardant, a compatibilizer, or a combination of a flame retardant and a compatibilizer wherein the compatibilizer is different from the styrenic resin.

7. The covered conductor of claim 4, wherein the styrenic resin is a hydrogenated styrenic block copolymer having a poly(alkenyl aromatic) content of 10 to 45 weight percent.

8. An automotive wire harness assembly comprising the covered conductor of claim 4.

* * * * *